(12) United States Patent
Perrenoud et al.

(10) Patent No.: US 10,378,246 B2
(45) Date of Patent: Aug. 13, 2019

(54) THEFT DETERRENT DEVICE AND SYSTEM

(71) Applicant: SkunkLock, Inc., San Francisco, CA (US)

(72) Inventors: Yves Perrenoud, San Francisco, CA (US); Daniel Idzkowski, San Ramon, CA (US)

(73) Assignee: SKUNKLOCK, INC., San Francisco, CA (US)

( * ) Notice: Subject to any disclaimer, the term of this patent is extended or adjusted under 35 U.S.C. 154(b) by 0 days.

(21) Appl. No.: 16/044,499

(22) Filed: Jul. 24, 2018

(65) Prior Publication Data

US 2018/0347231 A1 Dec. 6, 2018

Related U.S. Application Data

(63) Continuation-in-part of application No. 15/862,548, filed on Jan. 4, 2018, which is a continuation of
(Continued)

(51) Int. Cl.
*E05B 67/06* (2006.01)
*E05B 15/16* (2006.01)
(Continued)

(52) U.S. Cl.
CPC .......... *E05B 67/063* (2013.01); *B60R 25/023* (2013.01); *B60R 25/0225* (2013.01);
(Continued)

(58) Field of Classification Search
CPC .. E05B 15/16; E05B 15/1614; E05B 15/1621; E05B 15/1635; E05B 15/165;
(Continued)

(56) References Cited

U.S. PATENT DOCUMENTS 3,777,517 A * 12/1973 Shwayder ............... E05B 67/06
428/555
3,844,019 A 10/1974 Shwayder et al.
(Continued)

FOREIGN PATENT DOCUMENTS

CN 202561152 U 11/2012
DE 3206709 A1 9/1983
(Continued)

OTHER PUBLICATIONS

"U.S. Appl. No. 15/449,571, Examiner Interview Summary dated Nov. 3, 2017", 3 pages.
(Continued)

*Primary Examiner* — Christopher J Boswell
(74) *Attorney, Agent, or Firm* — Kwan & Olynick LLP

(57) ABSTRACT

A theft deterrent device includes a locking portion and a housing portion. The locking portion includes a locking mechanism. The housing portion includes a housing portion wall. The housing portion wall comprises a first material and is configured to house a second material within the housing portion wall. The second material is made of a different material than the first material. The second material is selected such that a cutting tool will be hindered when trying to cut through the housing portion.

20 Claims, 14 Drawing Sheets

Related U.S. Application Data application No. 15/449,571, filed on Mar. 3, 2017, now Pat. No. 9,890,561.

(60) Provisional application No. 62/304,106, filed on Mar. 4, 2016.

(51) Int. Cl.
| | | |
|---|---|---|
| *C06D 7/00* | (2006.01) | |
| *B65D 83/38* | (2006.01) | |
| *B65D 83/14* | (2006.01) | |
| *E05B 71/00* | (2006.01) | |
| *E05B 39/00* | (2006.01) | |
| *E05B 67/02* | (2006.01) | |
| *E05B 17/20* | (2006.01) | |
| *B60R 25/022* | (2013.01) | |
| *B60R 25/023* | (2013.01) | |
| *B65D 83/16* | (2006.01) | |

(52) U.S. Cl.
CPC ......... *B65D 83/382* (2013.01); *B65D 83/384* (2013.01); *B65D 83/752* (2013.01); *C06D 7/00* (2013.01); *E05B 15/16* (2013.01); *E05B 15/1614* (2013.01); *E05B 15/1635* (2013.01); *E05B 17/2084* (2013.01); *E05B 39/002* (2013.01); *E05B 67/02* (2013.01); *E05B 71/00* (2013.01); *B65D 83/16* (2013.01)

(58) Field of Classification Search
CPC ...... E05B 17/2084; E05B 67/00; E05B 67/06; E05B 67/063
See application file for complete search history.

(56) References Cited

U.S. PATENT DOCUMENTS

| | | | |
|---|---|---|---|
| 3,976,434 A * | 8/1976 | Shwayder | E05B 67/06 428/556 |
| 4,055,277 A | 10/1977 | Fegley et al. | |
| 4,561,272 A | 12/1985 | Goldstein | |
| 4,603,326 A | 7/1986 | Freed | |
| 4,698,620 A | 10/1987 | Marshall et al. | |
| 4,699,762 A * | 10/1987 | Andersen | B22F 7/06 156/294 |
| 5,194,845 A | 3/1993 | Sirmon et al. | |
| 5,274,353 A | 12/1993 | Bianchi | |
| 5,896,762 A | 4/1999 | Iidaka et al. | |
| 6,389,853 B1 | 5/2002 | Pate et al. | |
| 7,278,283 B2 * | 10/2007 | Meckbach | E05B 15/16 292/DIG. 38 |
| 8,068,027 B2 | 11/2011 | Auerbach et al. | |
| 8,156,772 B2 * | 4/2012 | Buhl | E05B 67/003 70/14 |
| 8,225,631 B2 | 7/2012 | Becker | |
| 9,115,511 B1 | 8/2015 | Schmidt et al. | |
| 9,890,561 B2 | 2/2018 | Perrenoud et al. | |
| 2005/0092038 A1 | 5/2005 | Becker | |
| 2016/0201357 A1 * | 7/2016 | George | E05B 67/063 70/38 R |
| 2017/0254114 A1 | 9/2017 | Perrenoud et al. | |
| 2018/0058106 A1 * | 3/2018 | Holmes | E05B 15/1614 |
| 2018/0142499 A1 | 5/2018 | Perrenoud et al. | |

FOREIGN PATENT DOCUMENTS

| | | |
|---|---|---|
| DE | 19538772 A1 | 6/1996 |
| DE | 19925919 A1 | 12/2000 |
| DE | 202008007411 U1 | 8/2009 |
| KR | 20100048016 A | 5/2010 |
| WO | 2017152100 A1 | 9/2017 |

OTHER PUBLICATIONS

"U.S. Appl. No. 15/449,571, Non Final Office Action dated Aug. 24, 2017", 8 pgs.
"U.S. Appl. No. 15/449,571, Notice of Allowance dated Dec. 20, 2017", 8 pages.
"International Application Serial No. PCT/US17/20742, International Search Report and Written Opinion dated Jul. 13, 2017", 8 pages.

* cited by examiner

THEFT DETERRENT DEVICE AND SYSTEM

CROSS-REFERENCE TO RELATED APPLICATIONS

This application is a continuation-in-part of U.S. patent application Ser. No. 15/862,548 by Perrenoud et al., filed on Jan. 4, 2018, titled "Pressurized Chemical Theft Deterrent Device," which is a continuation of U.S. patent application Ser. No. 15/449,571 by Perrenoud et al., filed on Mar. 3, 2017, titled "Pressurized Chemical Theft Deterrent Device," which is now U.S. Pat. No. 9,890,561, which claims priority under 35 U.S.C. § 119 to Provisional U.S. Patent Application No. 62/304,106 by Perrenoud et al., filed on Mar. 4, 2016, titled "Pressurized Chemical Theft Deterrent Device," which are all incorporated by reference herein in their entirety and for all purposes.

TECHNICAL FIELD

The present disclosure relates generally to theft deterrent devices.

BACKGROUND

Bicycle theft is a serious problem among bicycle owners. Traditional methods for preventing bicycle theft are inefficient and outdated. For example, the standard U-lock was invented in the 1970s and is no longer as effective as when it first came onto the market due to the fast paced evolution of technology providing newer and easier methods of stealing bicycles equipped with the standard U-lock. For example, given the power of today's tools, a bicycle thief can cut through a standard U-lock in a matter of seconds using the right tools.

Many companies have attempted to solve this problem by developing several different methods for curbing circumvention of a bicycle lock such as a U-lock. Such methods include making it possible to use fingerprints to open the lock, notifying a user after the bikes have been stolen using various technologies, or most commonly, simply making the lock stronger and more difficult to break. Unfortunately, these attempts still prove ineffective at ultimately preventing bicycle theft, which usually occur within 16 months of ownership. Thus, there is a need for an improved theft deterrent device that is effective against state of the art bicycle theft tools.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, embodiments of the present disclosure provide a theft deterrent device and a theft deterrent system. The theft deterrent device and system includes a locking portion and a housing portion. The locking portion includes a locking mechanism. The housing portion includes a housing portion wall. The housing portion wall comprises a first material and is configured to house a second material within the housing portion wall. The second material is made of a different material than the first material. The second material is selected such that a cutting tool will be hindered when trying to cut through the housing portion.

In some embodiments, the housing portion wall has a strength and thickness sufficient for providing resistance to or delayed cutting by a cutting tool. In some embodiments, the second material has a different strength and thickness for providing further resistance or delay to the cutting tool.

In some embodiments, the housing portion wall comprises hardened medium carbon steel. In some embodiments, the second material comprises ceramic media. In some embodiments, the second material comprises small bits of material packed tightly together. In some embodiments, the second material comprises one or more of the following: porcelain, aluminum oxide, tungsten carbide, silicon carbide, boron carbide, cubic boron nitride, and diamond. In some embodiments, the second material comprises one or more of the following shapes: cylinders, triangles, pyramids, cubes, and spheres.

In some embodiments, empty space within the housing portion is filled with an elastomer. In some embodiments, empty space within the housing portion is filled with materials or chemicals that ignite upon contact with external oxygen in the atmosphere or ignite while the cutting tool engages with the material.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
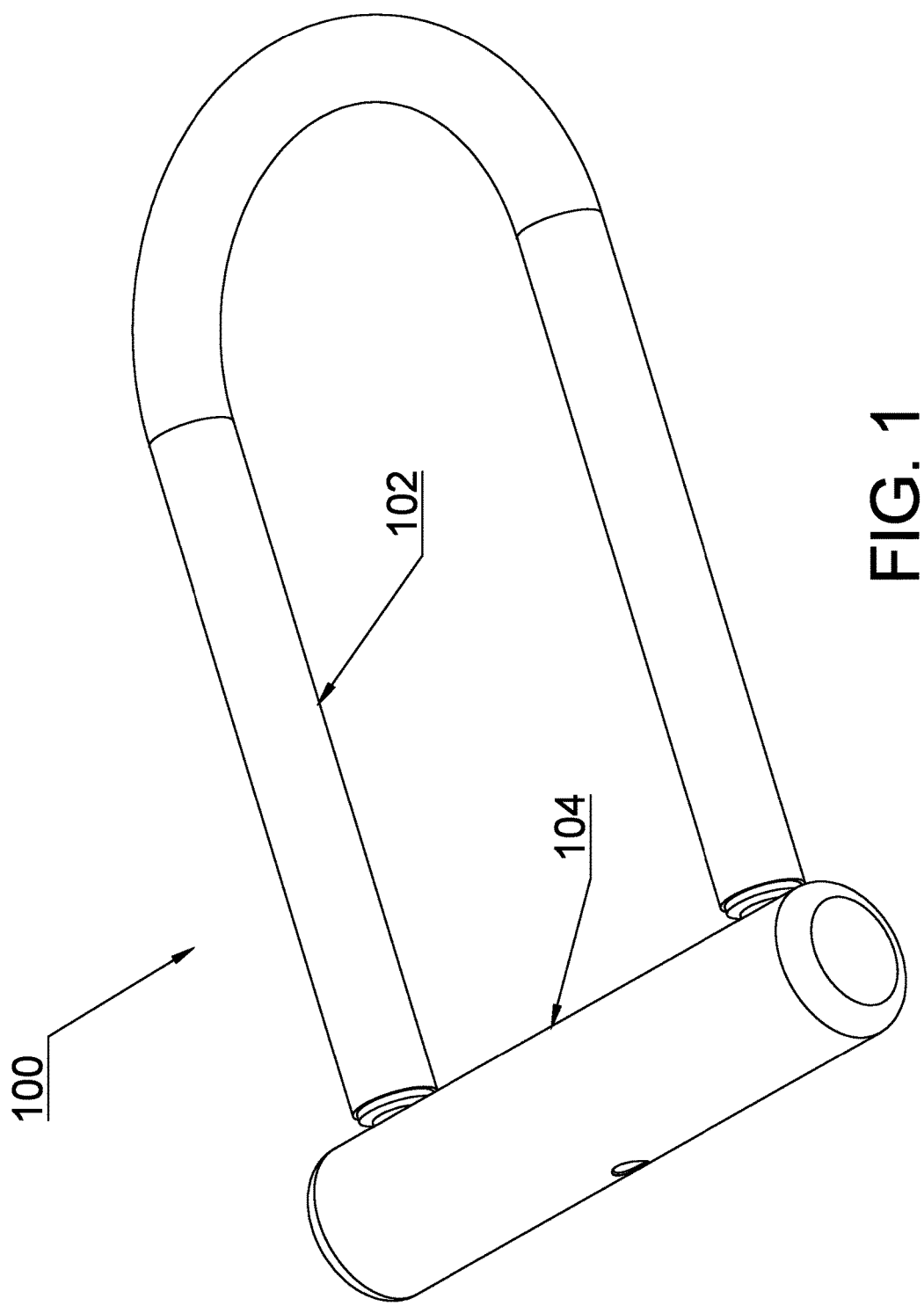
FIG. 1 illustrates an exemplary bicycle lock taking the form of a U-lock, in accordance with one or more embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular interlocking parts or chemical compositions. However, it should be noted that the techniques of the present disclosure apply to various other parts or compositions. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Embodiments of the present disclosure provide a solution for preventing bicycle theft, and serve as a deterrent lock. Existing bicycle locks deter bike thieves by becoming more durable and difficult to be severed (e.g., becoming larger and heavier), but they lack a deterrent as a defense mechanism against the bike thieves. For example, equipped with an angle grinder or bottle jack, thieves can break the most robust locks within a couple of minutes, not the mention that as locks evolve and become stronger, so do the tools that thieve can use to breach them. Embodiments of the present disclosure utilize an approach to protect personal properties by providing a lock that is either configured with a deterrent that is released airborne into the atmosphere to cause an effect on a thief so as to stop the thief from completing the attempt after being exposed to the deterrent, or contains multiple layers of different material to prevent cutting through the entire lock using an angle grinder. When a thief tries to grind or break through a lock in accordance with some embodiments of the present disclosure, either a potent, though non-toxic and legally compliant formula in reasonable concentrations, compound escapes from the lock, or the angle grinder breaks or is prevented from cutting through the lock due to the presence of a second material layer.

Example Embodiments

FIG. 1 depicts an exemplary bicycle lock taking the form of a u-lock in accordance with one or more embodiments of the present disclosure. Bicycle lock 100 has a shackle 102 and a locking portion 104 connected across the open ends of the shackle 102. The shackle 102 is configured to insert into the locking portion 104, and held in place by a locking mechanism configured within the locking portion 104 Here, the locking portion 104 is illustrated as a crossbar. The lock user generally places part of the element to be secured, as well as an immovable or affixed element such as, for example, a post, tree or railing, into the space (e.g., the U shaped space in this example) between the crossbar and the shackle, forming a physical coupling between the two and preventing someone from being able to remove the secured element without operating the locking mechanism. In order to be able to release the secured element, one has to either operate the locking mechanism, or physically break or cut the lock.

In some embodiments, the locking mechanism comprises the use of a key to turn a lock cylinder, or an electric motor operated by an electronic circuit when appropriate digital credentials are provided for example, via a contactless radio frequency based communication protocol, or via biometrics, or any suitable locking technologies. Granted that, to prevent one from successfully releasing the secured element without operating the locking mechanism, the lock has to be physically resilient (to actions such as for example, cutting and pulling), it's impossible to prevent someone from using a tool sufficiently powerful to overcome physical resiliency. Besides, the lock remaining practical and usable is another factor to be kept in mind when it comes to larger and heavier locks being more resilient physically. In some embodiments, the lock 100 contains a chemical deterrent. In some embodiment, the shackle 102, the crossbar 104 or both contain a chemical deterrent of a formula that, when released, exposes someone, who attempts to cut or otherwise breach the lock, to the effects of the deterrent. In some embodiments, the effects of a deterrent include, but not limited to, an unpleasant smell, which causes physical discomfort such as nausea and/or potentially involuntary reflex, e.g., vomiting, or the like; or a potent irritant such as lachrymatory agents, causing severe physical distress and incapacitation or the like, and/or the combinations thereof. In some embodiments, this combination of measures prevent a thief from completing the physical destruction of the lock, as well as provides a strong deterrent to an attempt of the theft in the first place.

Figure 2:
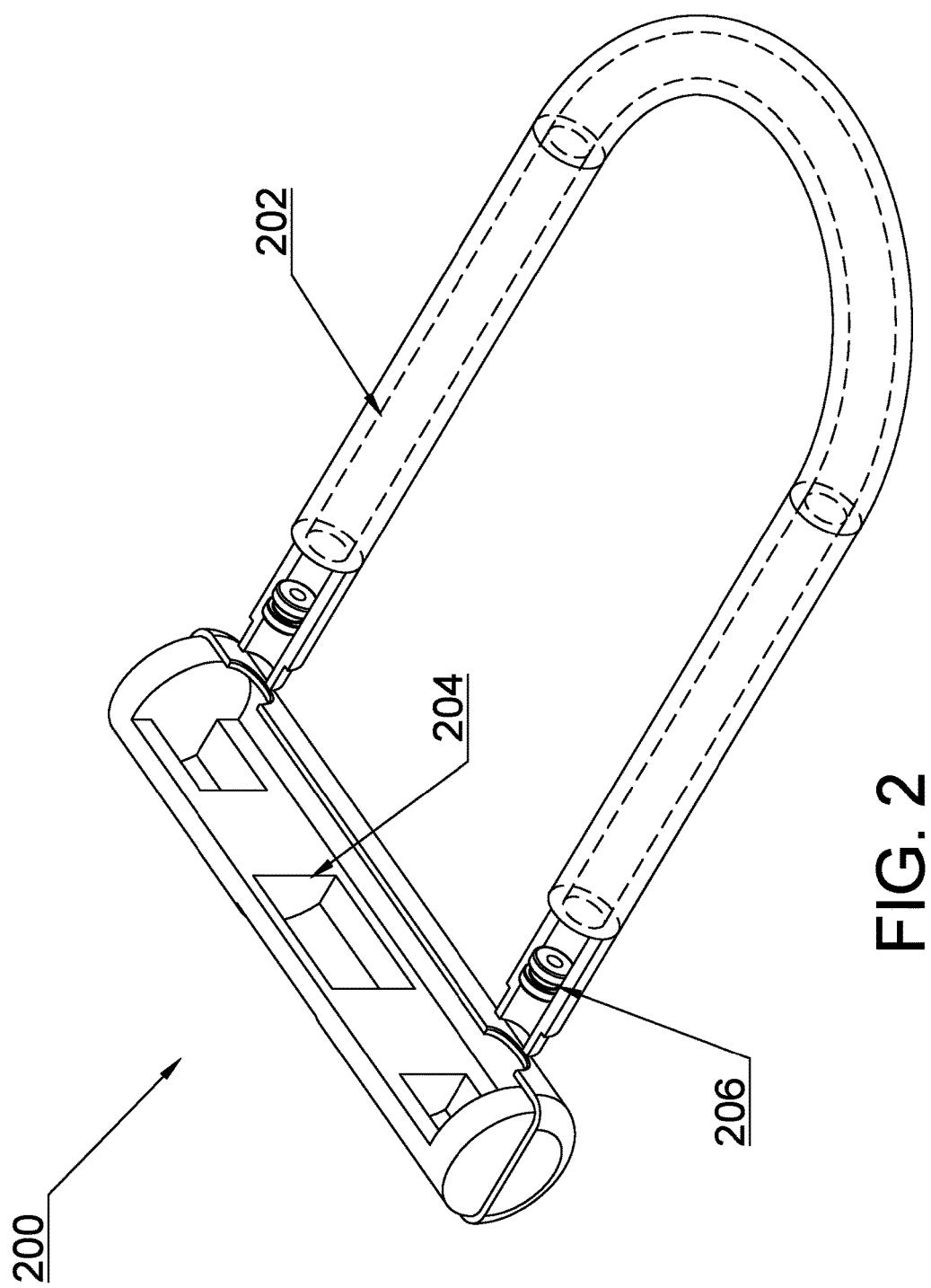
FIG. 2 illustrates a detail view of another exemplary lock, in accordance with one or more embodiments of the present disclosure.

FIG. 2 depicts a detail view of another exemplary lock 200 in accordance with one or more embodiments of the present disclosure. In some embodiments, Shackle 102 include a shackle wall 202, the wall having an outer surface, an inner surface, a thickness and forming an inside volume. As shown here in FIG. 2, in some embodiments the shackle wall 202 takes of the form of a hollow tube, which is configured to contain a pressurized chemical deterrent. A container 204 inside crossbar 104 also is configured to contain a pressurized chemical formula. The hollow tube 202 is preferably made of a material that has the following characteristics: strength, toughness, ductility and durability, such as, for example, steel, or hardened steel. In some embodiments, the thickness of the tube's wall is sufficient to provide resistance against cutting by tools and/or delay the action by more powerful tools. In some embodiment, the thickness is at least 3 mm when the tube is made of a hardened medium carbon steel. The inner diameter of the tube 202 is configured to provide a volume so that the chemical deterrent is contained and released in an effective amount against the person attempting to cut the shackle. In one embodiment, the inner diameter is about 10 mm, providing a total inner volume of about 40 ml.

In some embodiments, due to the potentially corrosive nature of the chemical deterrent, the walls of the tube 202 are coated with an inner lining of a layer of protective material, for example, a thin film of chemically resistant polymer such as an epoxy resin or a fluoropolymer based coating (PTFE, ECTE, FEP, etc.). The container 204 is protected by the outer wall of the crossbar 104 (for example, in one example, at least 3 mm when the crossbar 104 is made of hardened steel). In some embodiments, the crossbar 104 is made up of a similar or identical material as the hollow tube 202, and the container's material simply needs to withstand the pressure and the corrosiveness from the chemical deterrent housed inside. In this case, the container 204 is made of, for example, polymer that fulfills those characteristics, such as a polyolefin (polyethylene or polypropylene) or a polyvinyl chloride or the like. In some embodiments, the pressure inside the hollow tube 202 and the container 204 is both defined primarily by the equilibrium vapor pressure of the propellant used. For example, the afore mentioned pressures is typically between about 70 and about 100 PSI at 20° C.

In one embodiment, the propellant and the chemical formula are heterogeneously combined so that they're both released under pressure when the containment is breached. In some embodiments, a high volume of propellant which doesn't contribute to the deterrent effect is required. In another embodiment, requiring significantly less propellant to achieve the same or higher pressure, the propellant and the chemical formula are separated by a slider 206 on each side of the shackle 202 respectively, with an O-ring in their center groove. The propellant is contained towards the side of the O-ring facing the crossbar inserts. The deterrent is contained in the tube 202 between the sides of the O-ring facing away from the crossbar inserts. The O-ring creates a seal between the sides of the slider 206 such that the chemical formula and the propellant don't mix. In some embodiments, a small amount of the propellant in liquid form is required (enough to fill the entire volume of the shackle 202 when in gaseous form), hence a small amount of volume is necessary at each ends of the shackle to contain it. The will exerts pressure on the slider 206, which in turn transfers that pressure to the chemical formula. Since there's pressure exerted from both sliders, the chemical formula is under twice the vapor equilibrium pressure of the propellant. For example, at 20° C., from 140 to 200 PSI. When the containment is breached where the chemical formula is stored, it will be released at full pressure; and if the containment is breached where propellant is stored, half the propellant volume store din the shackle will be released, followed by the chemical formula once the slider 206 slides past the breach, under at half the initial pressure configured onto the deterrent. As the chemical formula is released, one or both sliders will slide through the tube, as the liquid propellant evaporates to maintain the equilibrium vapor pressure.

The sliders 206 are more effective if made of a material with a low coefficient of friction on steel, such as brass, polyethylene PTFE, or the like. In some embodiments, depending on the composition chosen for the chemical deterrent, chemical resistance is also required as well of the sliders 206. In one example, PTFE, which offers both a low coefficient of friction and chemical resistance, is a good choice for the material for the sliders 206. Similarly, the O-ring 518, which is configured to sit in the slider's center groove, also needs chemical resistance. In some embodiments, a fluoroelastomer such as, for example, Viton, or a perfluoroelastomer such as, for example, Kalrez or Perlast, is utilized as the materials for the O-ring 518.

In some embodiments, instead of crossbar inserts 304 and 306, two crossbar inserts 304 will be used. In other embodiments, two crossbar inserts 306 will be used.

In some embodiments, the crossbar 104 has a tubular construction. In some embodiments, the crossbar 104 is cylindrical, having a diameter greater than the diameter of the crossbar inserts of the shackle. The crossbar 104 is configured with a pair of aligned openings in the side of the crossbar and spaced apart from each other by a distance corresponding to the distance between the open ends (e.g., crossbar inserts as shown later) of the shackle 102.

In some embodiments, the inside volume of the tube 202 is the containment chamber, which contains chemical deterrent directly. In some embodiments, the inside volume of the tube 202 is further configured to house separate one or more containment chambers, e.g., small-sized containers made of the materials described for the container 204, the separate containment chambers containing chemical deterrents. In some embodiments, the inside volume of tube 202 functions as both the containment chamber and the housing for separate containment chambers. In some embodiments, the inside surface of the crossbar 104 is protected the protective layer such as the thin film described above.

Figure 3:
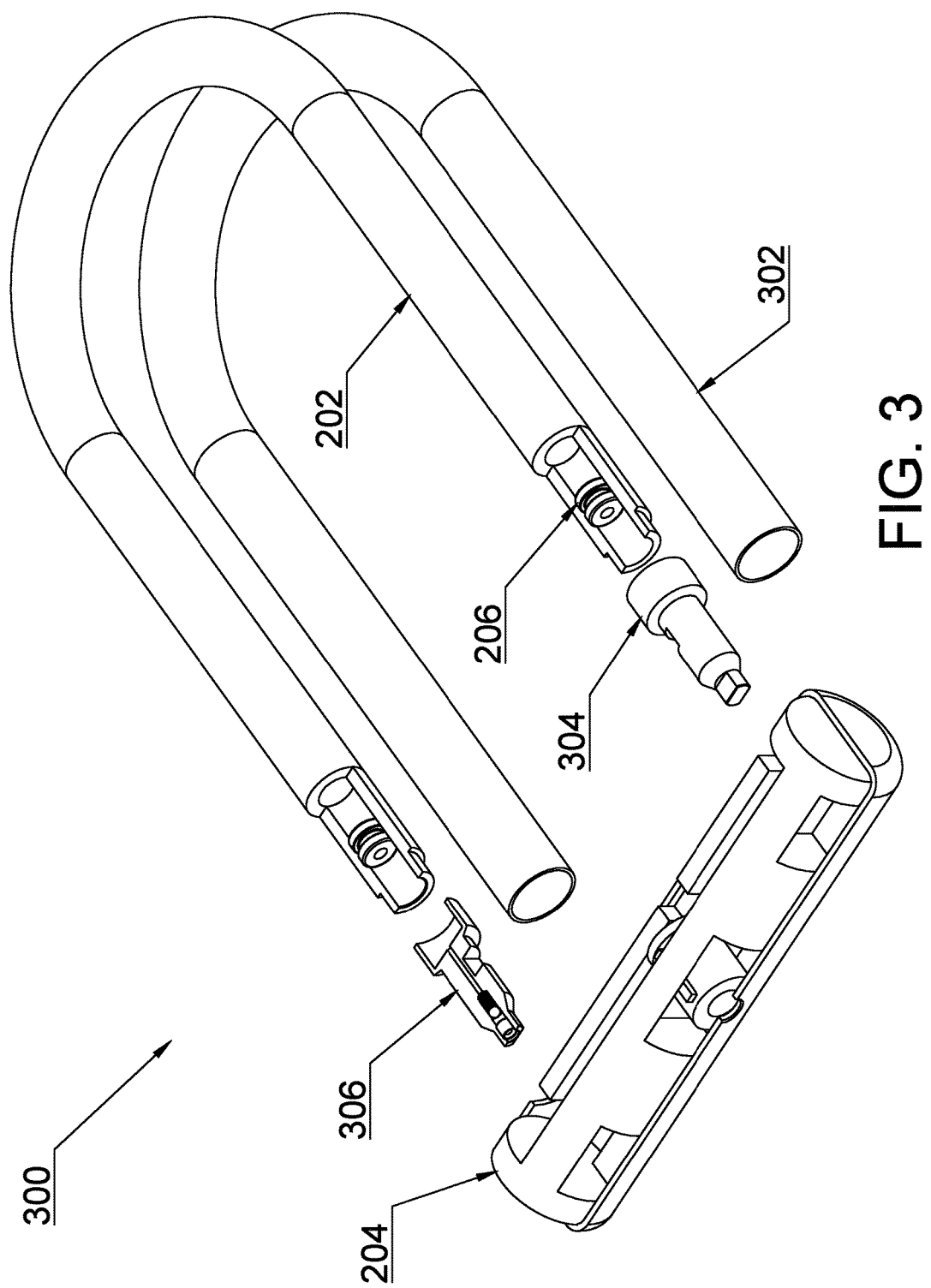
FIG. 3 illustrates an exploded view of another exemplary lock, in accordance with one or more embodiments of the present disclosure.

FIG. 3 depicts an exploded view of an exemplary lock 300 in accordance with one or more embodiments of the present disclosure. In some embodiments, the shackle is further shown to have an outer layer 302, in addition to the hollow tube 202. The open ends of the shackle are coupled with crossbar inserts 304 and 306, respectively. Here, crossbar insert 306 is illustrated in a cross-section view, and crossbar insert 304 is illustrated in a perspective view. In some embodiments, the outside of the crossbar is protected an outer layer as the shackle.

Figure 4:
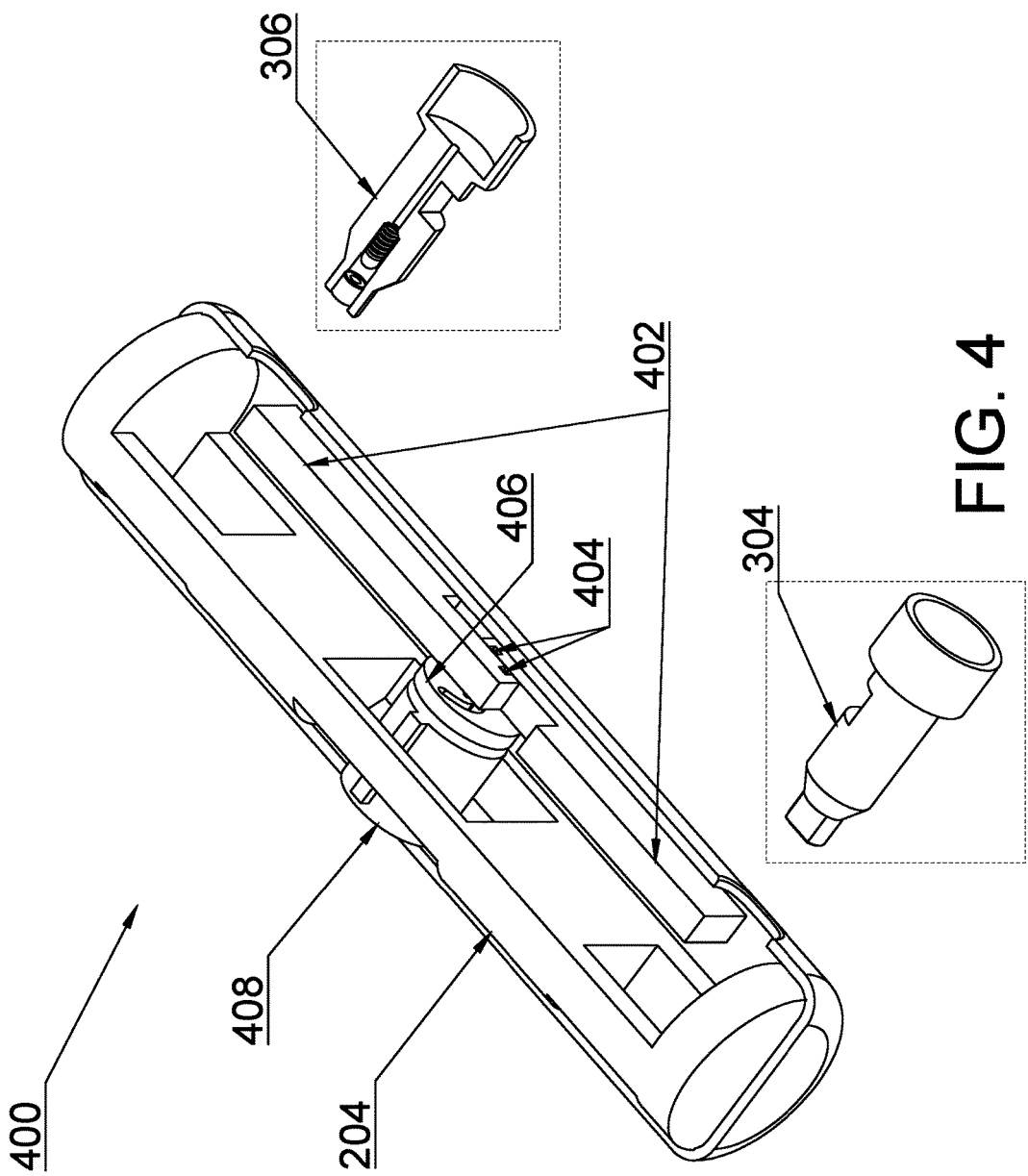
FIG. 4 illustrates a fragmentary enlarged exploded view of an exemplary lock, in accordance with one or more embodiments of the present disclosure.

FIG. 4 depicts a fragmentary enlarged exploded view of the exemplary crossbar 400 in accordance with one or more embodiments of the present disclosure. Here, inserts 304 and 306 are not part of the crossbar 400. In addition to container 204, crossbar is further shown to contain a locking mechanism 408 and a locking cam 406 operated by the locking mechanism. In some embodiments, the locking mechanism comprises a lock cylinder as shown herein. In some other embodiments, the locking mechanism 408 comprises an electric motor (not shown here). The locking mechanism 408 can also comprise any type of locks, e.g., magnetically operated locks, combination lock, and the like. The locking cam 406 is coupled to the locking mechanism 408 so that when actuated, it turns in unison. As illustrated in FIG. 4, the locking cam 406 is coupled to the locking mechanism 408 which is a lock cylinder such that when the lock cylinder is operated by a corresponding key, the locking cam 406 turns in unison. In some embodiments not shown here, the locking cam 406 is coupled to the locking mechanism 408 which is a motor such that when the motor is actuated by a corresponding electronic circuit board, the locking cam 406 turns in unison. In some embodiments, a pair of cam pins 404, are both inserted into the grooves of locking cam 406 and the slots in locking bar 402. The cam pins 404 slide in the locking cam's grooves to move the locking bars 402 back and forth, depending on the rotational direction of the locking mechanism 408, thus changing from a locked position to a unlocked position and vice versa. Locking bars 402 prevent crossbar inserts 304 and 306 from being removed from the crossbar when in locked position as depicted in FIG. 4. Preferably, the locking bars 402 has high ductility to resist attacks such as pulling on the lock. In some embodiments, the locking bar 402 are made of high ductility steel or the like.

Figure 5:
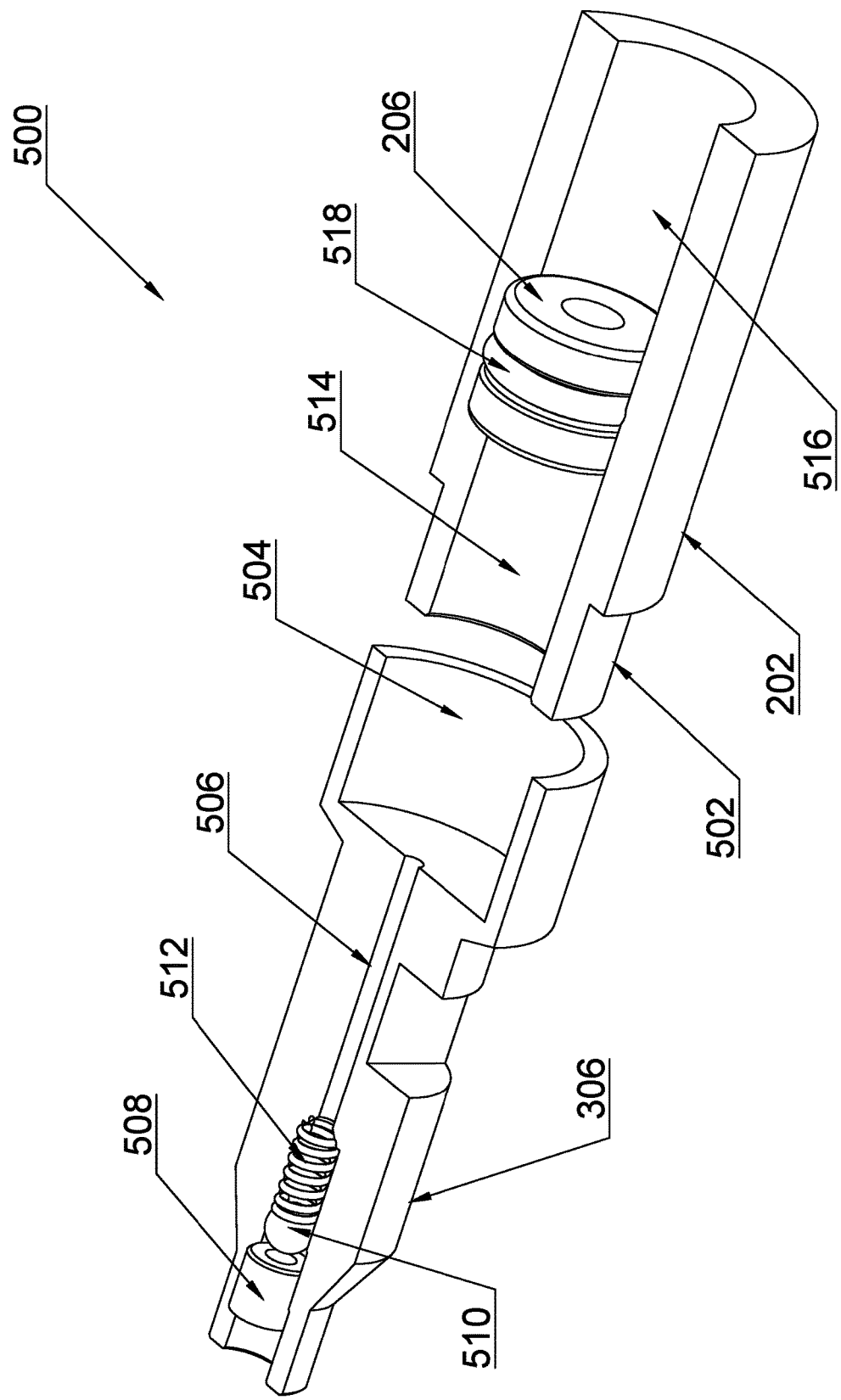
FIG. 5 illustrates a sectional view of the crossbar insert of an exemplary lock, in accordance with one or more embodiments of the present disclosure.

FIG. 5 depicts a sectional view 500 of the crossbar insert of a fragmentary exemplary lock in accordance with one or more embodiments of the present disclosure. The crossbar insert can be crossbar inserts 306 and 304, which in turn can be the same. For the purposes of simplicity, only crossbar insert 306 is illustrated in FIG. 5. Crossbar insert 306 has a generally cylindrical insert body having an open end to couple to the open end of the tube 202. The cylindrical body also is tapered to form an tip end at the end that inserts into the crossbar 104. The insert body further includes a groove configured on the side thereof, the width of the groove matching the width of the crossbar that comes into a locking position when the locking mechanism is operated. The depth of the groove is sufficient to provide a secure locking position between the crossbar insert 306 and the crossbar. In addition, the depth of the groove does not extend beyond where the hole/channel 506 is positioned. The crossbar insert 306 comprises a check valve. In one embodiment as shown here in FIG. 5, the check valve comprises coiled spring 512, valve ball 510 and press fit retaining insert 508, held in place through an interference fit. In another embodiment not shown here, the check valve comprises a elastomer based flap valve held in place by an interference fit. In yet another embodiment not shown here, a self-healing polymer instead of a check valve is used. The check valve leads to hole 506, allowing the tube 202 of the shackle 102 to be filled under pressure with chemical deterrent or just the liquid propellant if sliders 206 are used. In some embodiments, filling the tube 202 of the shackle comprises using a custom built elastomer or rubber based nozzle matching the shape of the press fit insert to achieve a liquid tight seal, when the check valve is used as illustrated in FIG. 5. In some other embodiments, a hollow needle in the case of an elastomer flap valve design and the self-healing polymer alternative, connected to a container filled with the chemical deterrent or the liquid propellant when sliders 206 are used. Once the tube 202 of the shackle is filled, the hole in the tip of crossbar insert 306 is permanently sealed with mechanisms such as solder or an epoxy resin, thus the check valve's corrosion resistance and effectiveness is minimal, as it only needs to prevent reverse flow for the few seconds or minutes until the permanent seal is put in place. Crossbar inserts 304 and 306 are adapted to be coupled to the hollow tube 202 by permanently mating shaft 502 to hole 504. In some embodiments, the mating comprises an interference fit or screw-threading one side onto the other, combined with either a welding or gluing operation to ensure a permanent mating, a stronger mating and a liquid proof seal If two crossbar inserts 304 are used, then the shackle is filled while maintaining the shackle and its contents at a low enough temperature to ensure that the propellant remains liquid. If the sliders 206 are used, the volume 514 contains the propellant in liquid form; and volume 516, which extends all the way to the other slider on the other side of the shackle 202, contains the chemical formula. The center groove of sliders 206 contain a O-ring 518 to provide a static and dynamic seal.

Figure 6:
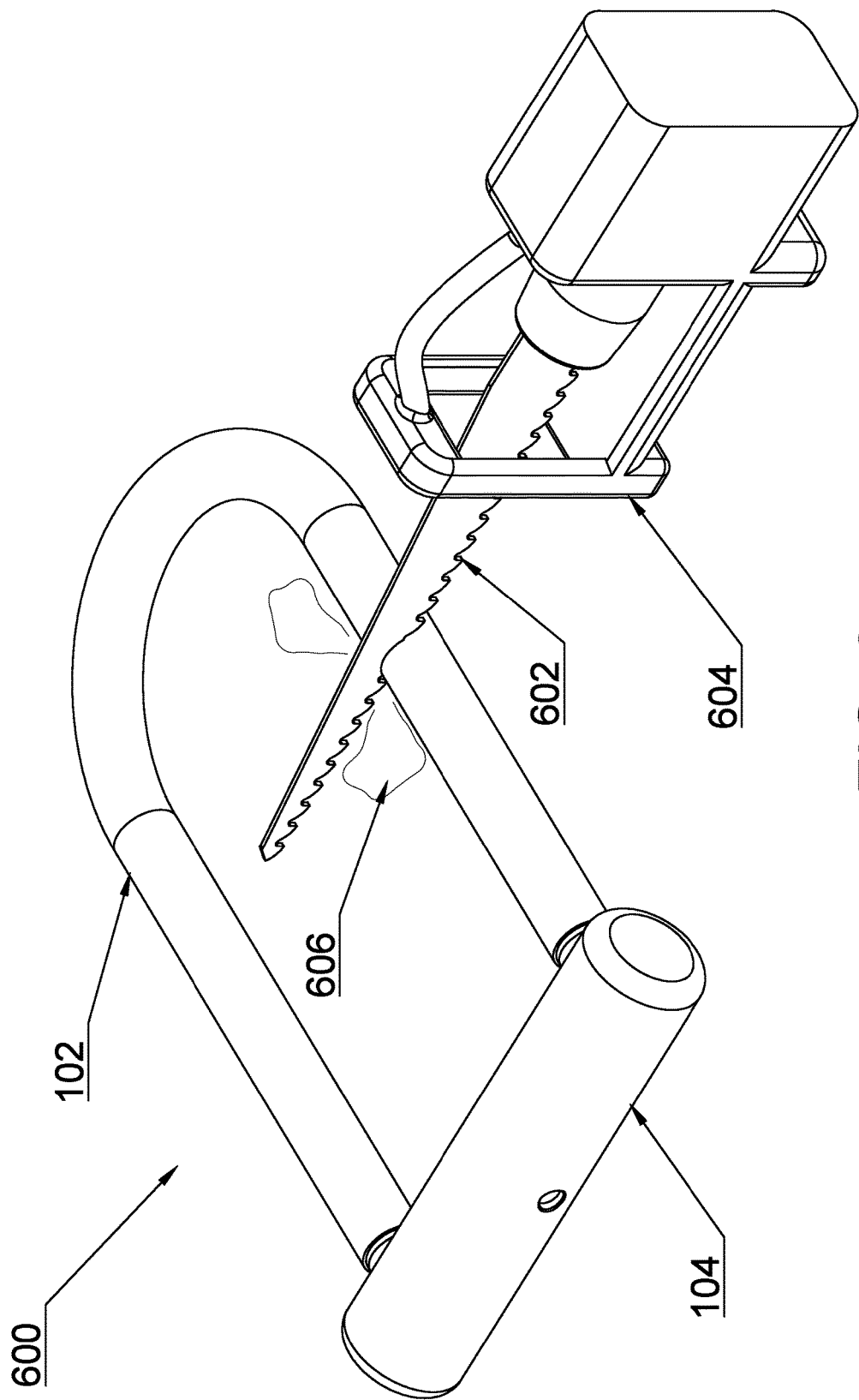
FIG. 6 illustrates a diagram of one example of the releasing of the chemical deterrent upon an attempt to cut through an exemplary lock, in accordance with one or more embodiments of the present disclosure.

FIG. 6 depicts a diagram of one example of the releasing of the chemical deterrent upon an attempt to cut through an exemplary lock 600 in accordance to one or more embodiments of the present disclosure. Here, a cutting tool 604 is shown cut at the lock 600 at the shackle 102. In other scenarios, cutting tool 604 can be used to cut at the lock at crossbar 104 (not shown). In this example, when blade saw 602 of the cutting tool 604 cuts deep enough to pierce the containment of chemical deterrent 606, the contents under pressure is released in an aerosolized form, as depicted in FIG. 6. Any tool can be used to breach the lock, for example, a reciprocal saw, angle grinder, bolt cutters, or the like. The released aerosolized contents is sufficient in volume (in either case where the crossbar 104 or the shackle 102 is attacked) to incapacitate the individual attempting to break the lock 600. In some embodiments, the mating of 502 to 504 (not shown here) is configured to resist less pulling force than what's required to forcefully pull the fully assembled shackle 102 out of the crossbar 104 so that in a pulling attack on the lock 600, the chemical deterrent 606 is also released.

In some embodiments, the chemical formula 606 comprises one or more of the following elements: a potent irritant element, such as lachrymatory agents, a foul smelling element, a colored dye or pigment, a propellant, and a number of additional elements that don't serve any active purpose but necessary for the formula to be produced. For example, the additional elements can comprise binding elements, solvents, anti-freeze, preservatives, or the like. In some embodiments, the irritant element is extremely potent. In some embodiments, the smelling element is extremely foul smelling. In some embodiments, the dye or pigment is bright colored.

In some embodiments, the irritants or lachrymatory agents comprises one or more of capsaicinoid (capsaicin, dihydrocapsaicin, nonivamide), 2-chlorobenzalmalononitrile, dibenzoxazepine, phenacyl chloride, syn-propanethial-S-oxide.

In some embodiments, the foul smelling element comprises one or more of butyric acid, thiols (1,3-Propanedithiol, isobethanethiol, methanethiol, propanethiol, butanethiol), propionic acid, putrescine, cadaverine, skatole, hydrogen sulfide, ammonium sulfide.

In some embodiments, the propellant comprises one of butane, isobutene, propane, diethyl ether, dimethyl ether, methyl chloride (chloromethane).

In one embodiment, an inflatable stretchable elastomer or rubber (e.g., similar to a party balloon) container, connected to the exit hole 506 of the check valve, is inflated with the chemical deterrent 606, inside hollow tube 202. The elastomer or rubber, is chosen to resist the corrosion of the chemical deterrent and hence protecting hollow tube 202 from corrosive attack. In some embodiments, a fluoroelastomer, such as Dupont's Kalrez proprietary perfluoroelastomer is used. In some other embodiments a TFEP based solution, such as the proprietary Aflas is used.

Figure 7:
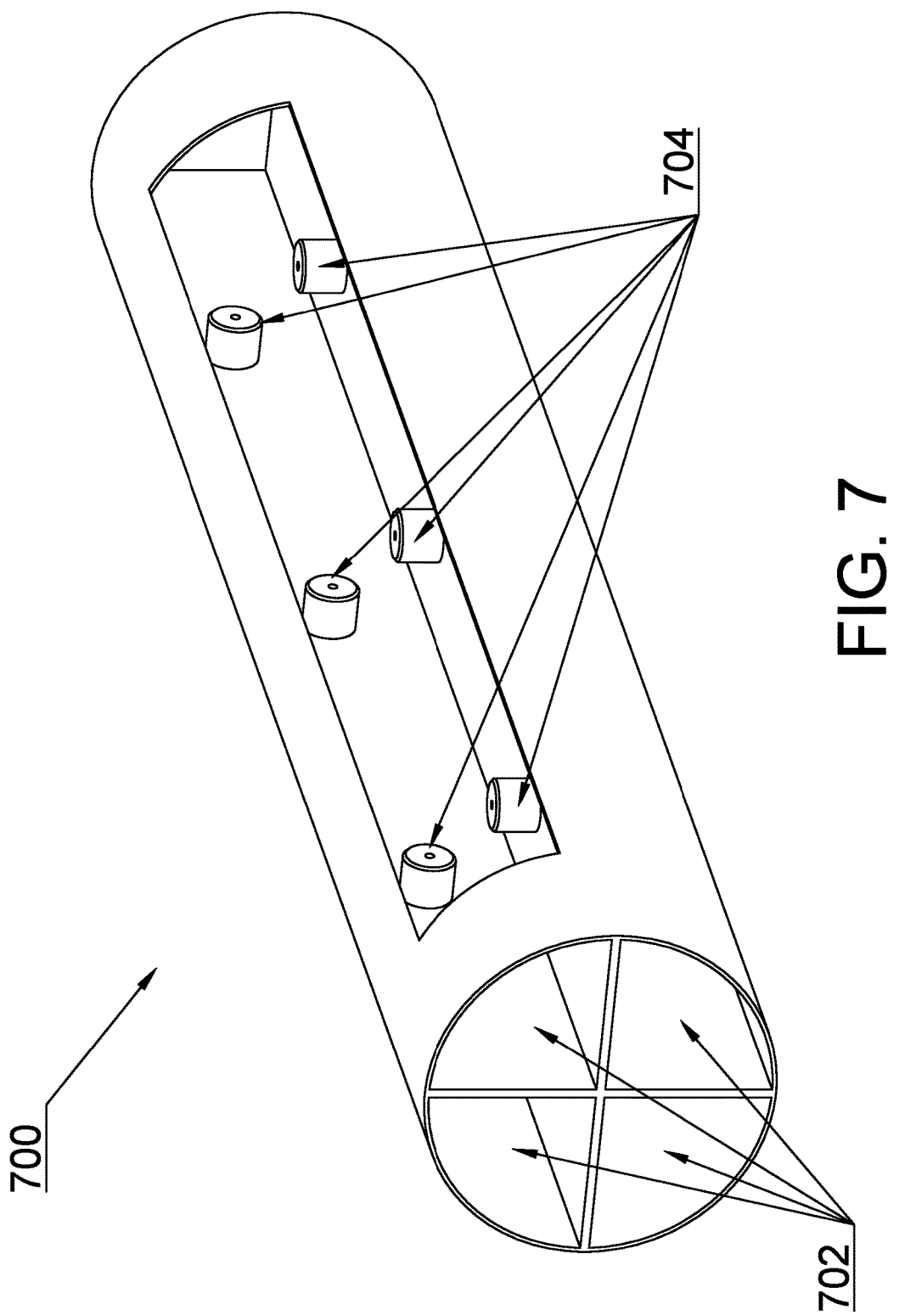
FIG. 7 illustrates a diagram of an exemplary containment chamber configured inside the shackle walls of an exemplary lock, in accordance with one or more embodiments of the present disclosure.

FIG. 7 depicts a diagram of an exemplary containment chamber configured inside the shackle walls of the exemplary lock in accordance of one or more embodiments of the present disclosure. In some embodiment, an elastomer tube, resistant the corrosion of the chemical deterrent (fluoroelastomer for instance), matching the diameter of hollow tube 202, is configured to have internal chambers. In some embodiments, as shown here in FIG. 7, the elastomer tube 700, internally subdivided longitudinally into four or more sections of equal size, is inserted into hollow tube 202. Each section 702 of the tube 700 is connected internally to the two adjacent sections 702 with a nozzle 704, which releases the chemical deterrent contained in those sections in a fine aerosolized form, when the pressure differential allows it. This provides effectiveness of aerosolizing the chemical deterrent under a variety of different cutting attacks on the shackle 102. This also ensures that the aerosolized release of the chemical deterrent is extended in duration. In some embodiments, the sections are filled simultaneously and uniformly by connection the end of each one to the check valve's exit hole 506. In other embodiments, the crossbar insert 306 does not have a check valve, exit hole 506 extends all the way to the tip, and a check valve is integrated to the elastomer's tube 700, connected to exit hole 506 and to each section directly. In some embodiments, a similar multi-sectional design with a nozzle leading from each adjacent section to the other, is used on the crossbar container 204, to achieve the same aerosolizing improvement.

In one embodiment, when the cutting tool first breaches the containment, only one section 702 will be breached. If the breach is large enough, the contents of that section 704 will be released fairly rapidly. The pressure thus drops in that section, and the two adjacent sections 702 starts releasing their contents into this breached section via the nozzles 704 connecting them, optimizing the decreolization effect and controlling the speed of release, thus increasing and prolonging the exposure to the individual operating the cutting tool and increasing the degree of discomfort caused.

In some embodiments, the lock mechanism 408 is a padlock, and accordingly shackle 102 is substantially shorter than the illustrated shackle 102 in FIG. 1, and the length of the crossbar 104 is reduced as well. In other embodiments, the lock comprises a rotating shackle instead of a removable shackle to reduce the shackle length exposed to potential attacks on the lock. The chemical deterrent is included in both crossbar 104 and shackle 102 in a manner similar to the above description for the embodiments illustrated in FIGS. 1-7.

In some embodiments, the locking mechanism 408 comprises a disc brake lock, and accordingly the crossbar 104 is shaped such that a disc brake is inserted in between the main body of the crossbar 104. Thus, when a short shackle 102 bridges the gap between the two sides of the crossbar 104 to achieve the locked state, upon going through one of the many holes of the disc brake, the rotation is restricted and thus the wheel the disc brake mounted to no longer rotates, immobilizing the vehicle it is attached to.

In some embodiments, the chemical deterrent is contained within a number of small containers, for example, spheres or dodecahedron having a nozzle exit hole. In some embodiments, the exit hole is of a small size. Such small containers are filled at a low temperature, about below the propellant's boiling point. When the propellant is in stable liquid form, the container is inserted inside hollow tube 202 and container 204, to the extent of as many as possible to fit therein.

The remaining volume of 202 and 204 is then filled with the chemical deterrent. When the outer containment is breached, the chemical deterrent is released through the breach, the pressure drops, and therefore small containers inside start releasing their contents through their nozzles, in a controlled and aerosolized manner. In some embodiments, the aerosolizing is optimized.

In some embodiments, to improve the effectiveness of the irritant element, the dispersal radius of the aerosolized chemical deterrent needs to reach approximately 1.5 m. The foul smelling element has a much wider area of effect. To increase or decrease the dispersal radius and the internal pressure of the containers, the equilibrium vapor pressure needs to be varied. In some embodiments, the size of the dispersal radius is inversely proportional to the duration of the dispersal. In one embodiment, the propellant having a lower vapor pressure is selected to increase the duration of the release and lower the dispersion radius, which is effective for use primarily or exclusively indoors. In another embodiment, the propellant having a higher vapor pressure is selected to increase the dispersion radius and decrease the duration of the release, which is effective for use primarily outdoors. The range of internal pressures that can be achieved with common propellants varies from about 15 to about 750 PSI.

Figure 8:
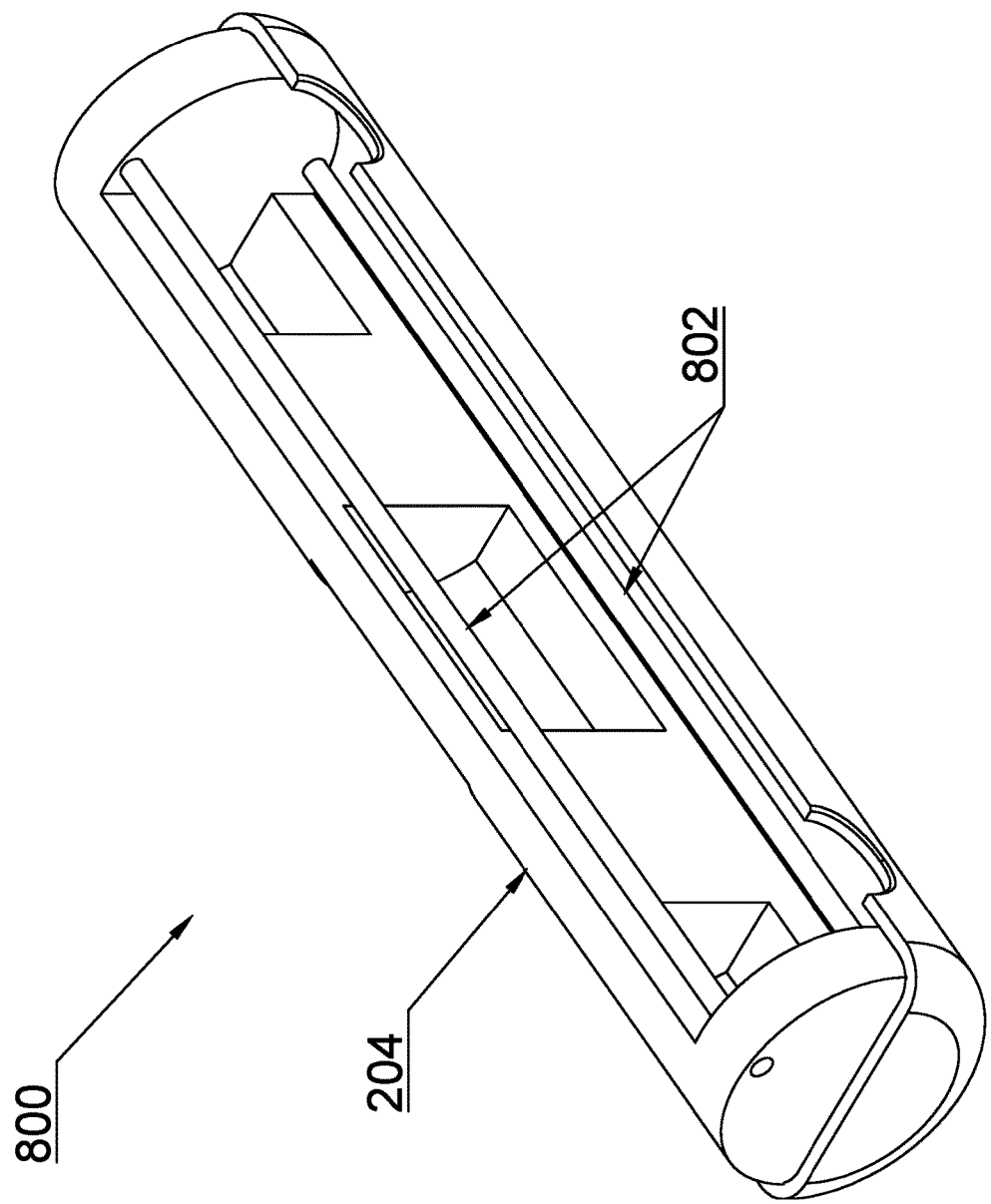
FIG. 8 illustrates a diagram of another exemplary crossbar of an exemplary lock, in accordance with one or more embodiments of the present disclosure.

FIG. 8 depicts another exemplary crossbar 800 of an exemplary lock in accordance of one or more embodiments of the present disclosure. As shown in FIG. 8, two ceramic bars 802 are configured on a side of the crossbar 800 respectively, within the confines and hence protection of the outer steel cylinder. In some embodiments, the bars 802 are mounted to the container 204, which comprises of a polymer material, would provide an amount of shock absorption to offset the inherent ceramic brittleness. Since most steel cutting wheels are incapable of cutting through ceramic, except for tools such as diamond cutting wheels, it is more difficult for the crossbar 800 to be cut through. Since diamond wheels are much slower at cutting steel than specialized cutting wheels, the attack using such wheels is slowed down. In other embodiments, the chemical formula container 204 is replaced by a polymer frame with materials such as elastomeric or foam based ceramic support elements or the like, which allows for better shock absorption combined with thicker ceramic bars. In other embodiments, a flexible ceramic bar is configured to be inserted into the tube 202 of shackle 102, with or without the presence of the chemical formula, conferring significantly enhanced cutting resistance to the Shackle 102. In one embodiment, for the ceramic bar to be configured as flexible, small pieces of ceramic embedded are in an elastomeric substrate to confer both the required flexibility, to match the general U shape of the shackle, and to provide for the shock resistance. In another embodiment, the flexible ceramic comprises segments configured to link to each other, in a manner such as how metal watch bracelets or Rado ceramic watches configure linked segments to allow the overall shape of the bracelets to be able to conform to the shape of a wearer's wrist.

Figure 9:
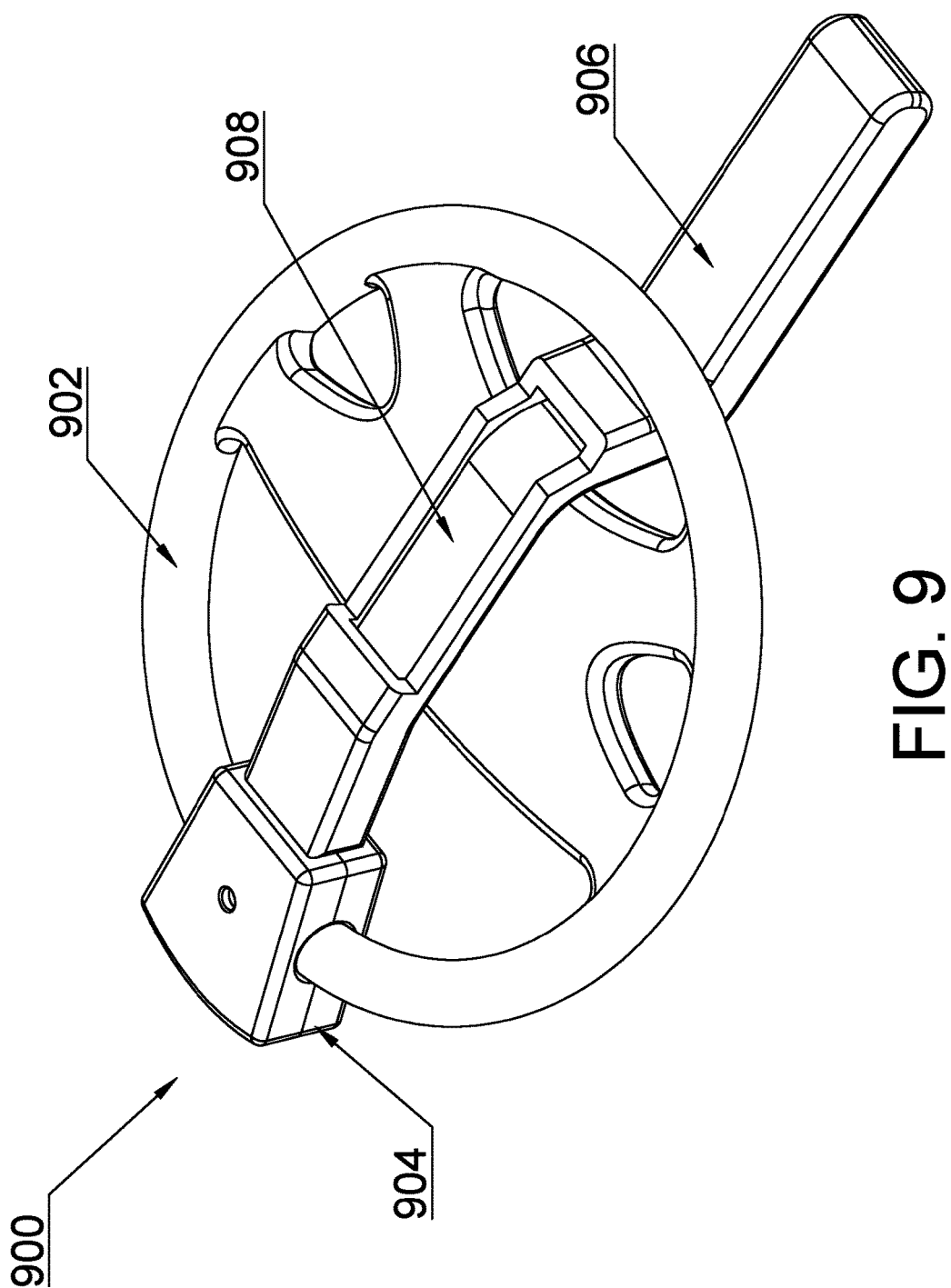
FIG. 9 illustrates a diagram of another exemplary bicycle lock that is not generally U-shaped, in accordance with one or more embodiments of the present disclosure.

FIG. 9 depicts another exemplary lock 900 in accordance of one or more embodiments of the present disclosure. Here, FIG. 9 depicts a car steering wheel lock, which significantly impairs the turning of the wheel when locked into place by lock 900. In some embodiments, a key operated locking mechanism 904 is locked onto the steering wheel 902, such that the constraining bar 906 can't be removed from the wheel and impairs the rotation of the wheel, by physically touching upon elements such as the car's dashboard and console. In some embodiments, the pressurized chemical deterrent is contained within a hollow chamber 908 of the constraining bar 906. When a thief attempts to cut the bar 906 to regain full rotation of the steering wheel, the pressurized contents are released, incapacitating the thief and making it intolerable to remain inside the vehicle.

Figure 10:
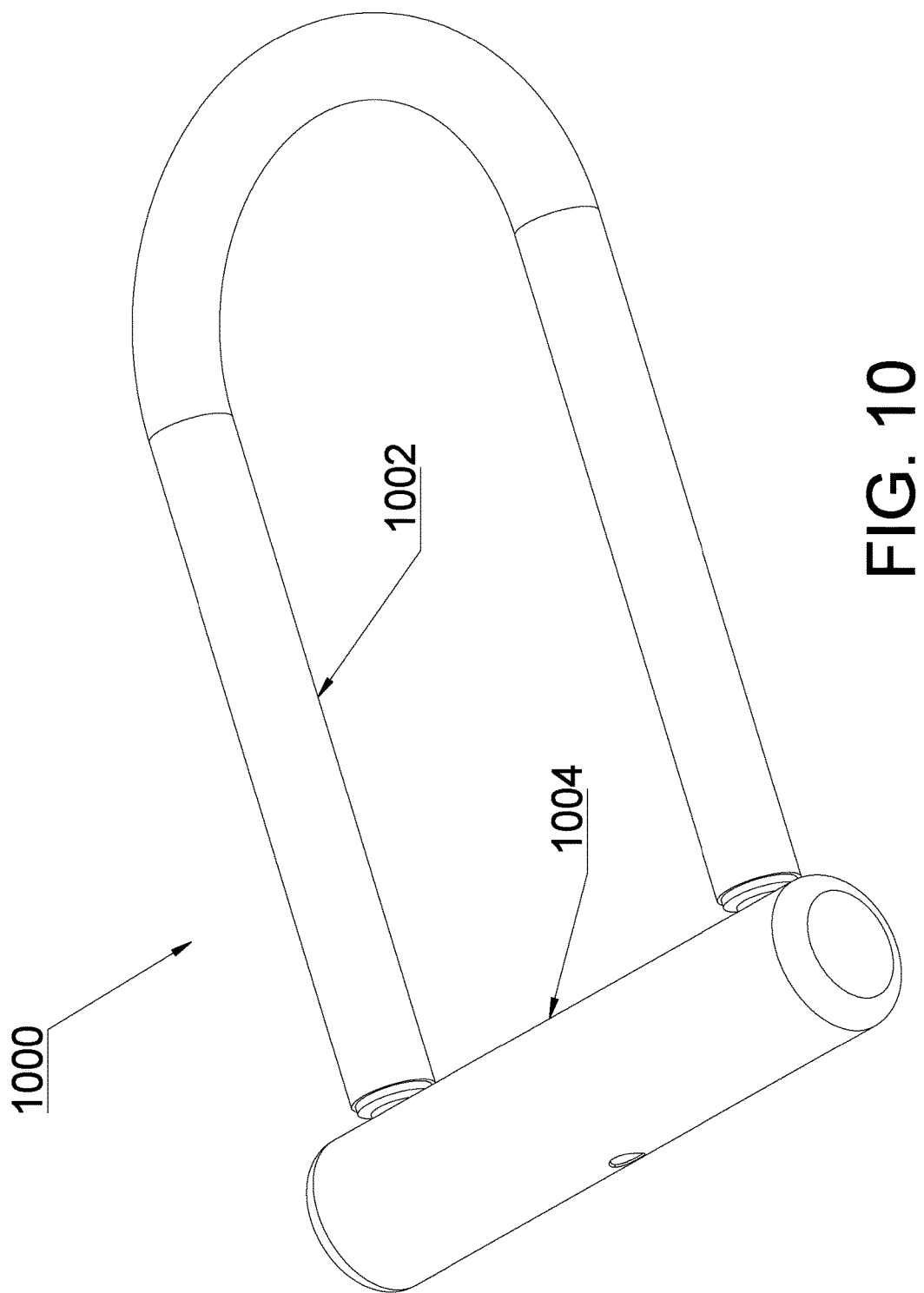
FIG. 10 illustrates a diagram of an exemplary multi-material bicycle lock taking the form of a U-lock, in accordance with one or more embodiments of the present disclosure.
Figure 12:
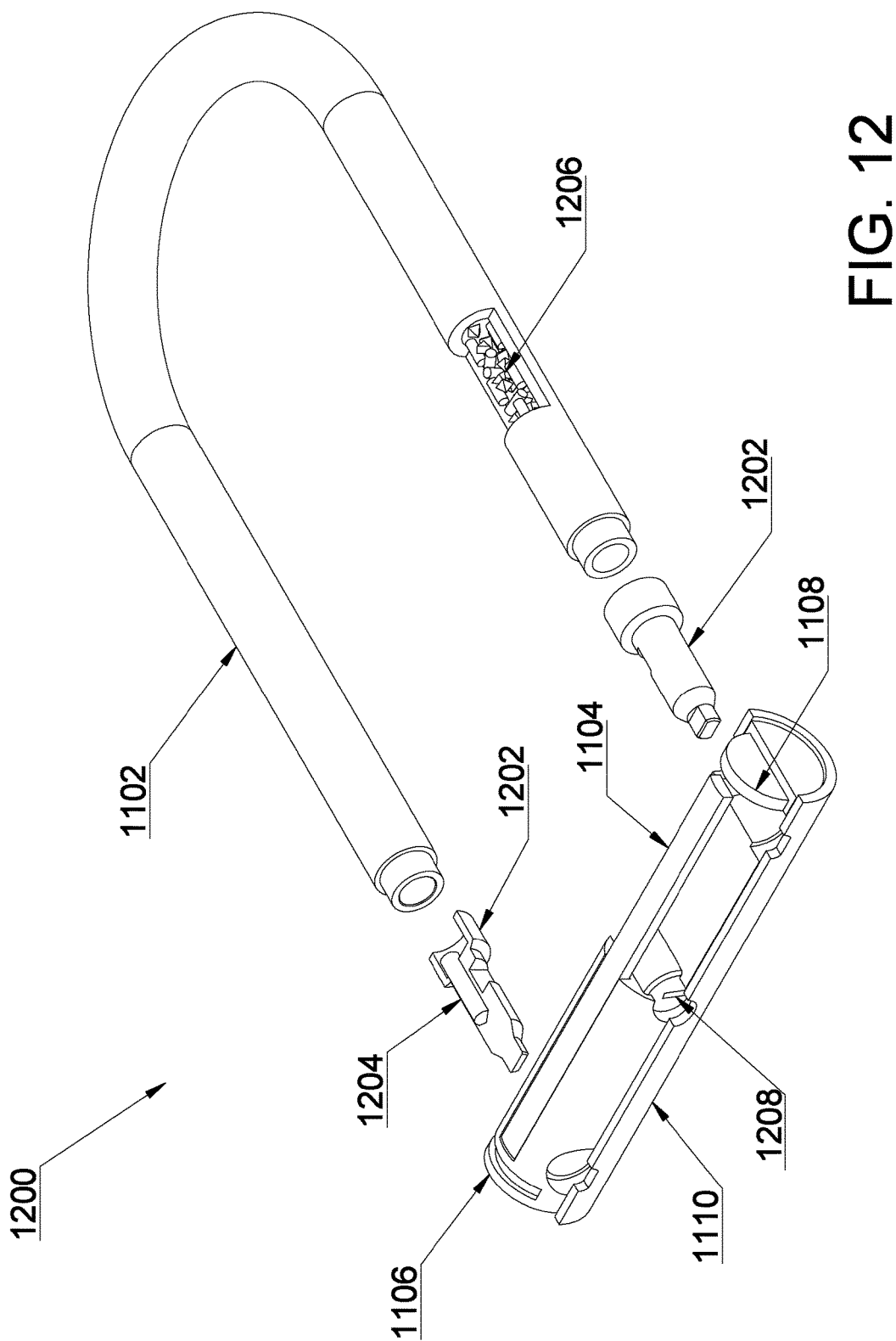
FIG. 12 illustrates yet another detail view of an exemplary multi-material bicycle lock, in accordance with one or more embodiments of the present disclosure.

FIG. 10 depicts an example multi-material bike u-lock, composed of a shackle 1002 and a crossbar 1004. The shackle is inserted into the crossbar, and held in place by a locking mechanism contained within the crossbar (as depicted in FIG. 12). The user generally places part of the element to be secured, as well as an immovable element, into the empty space (U shaped in this embodiment) between the crossbar and the shackle, forming a physical link between the two and preventing someone from being able to take the secured element without operating the locking mechanism. In order to be able to release the secured element, one has to either operate the locking mechanism, or physically break or cut the lock. The locking mechanism could involve the use of a key to turn a lock cylinder, or an electric motor operated by an electronic circuit when the user offers up the appropriate digital credentials via a contactless radio frequency based communication protocol, or via biometrics. To prevent one from successfully releasing the secured element without operating the locking mechanism, the lock has to be physically resilient (to impact, cutting and pulling). Due to the evolution of power tools, particularly portable power tools, such as battery operated angle grinders, it's no longer possible to prevent someone from cutting through hardened steel (the traditional material used to make bike u-locks), and with a battery operated angle grinder, one can get through a fairly thick hardened steel shackle in a matter of seconds. In order to prevent cutting with basic power tools and drastically slowing down the cutting process (from seconds to minutes, 15-30 minutes depending on the tool) with high-end power tools, embodiments of the present disclosure use a combination of materials, to prevent or slow down the attack on the bike u-lock. Each material is chosen to resist specific types of tools and the materials are layered to avoid exposing any weaknesses.

Figure 11:
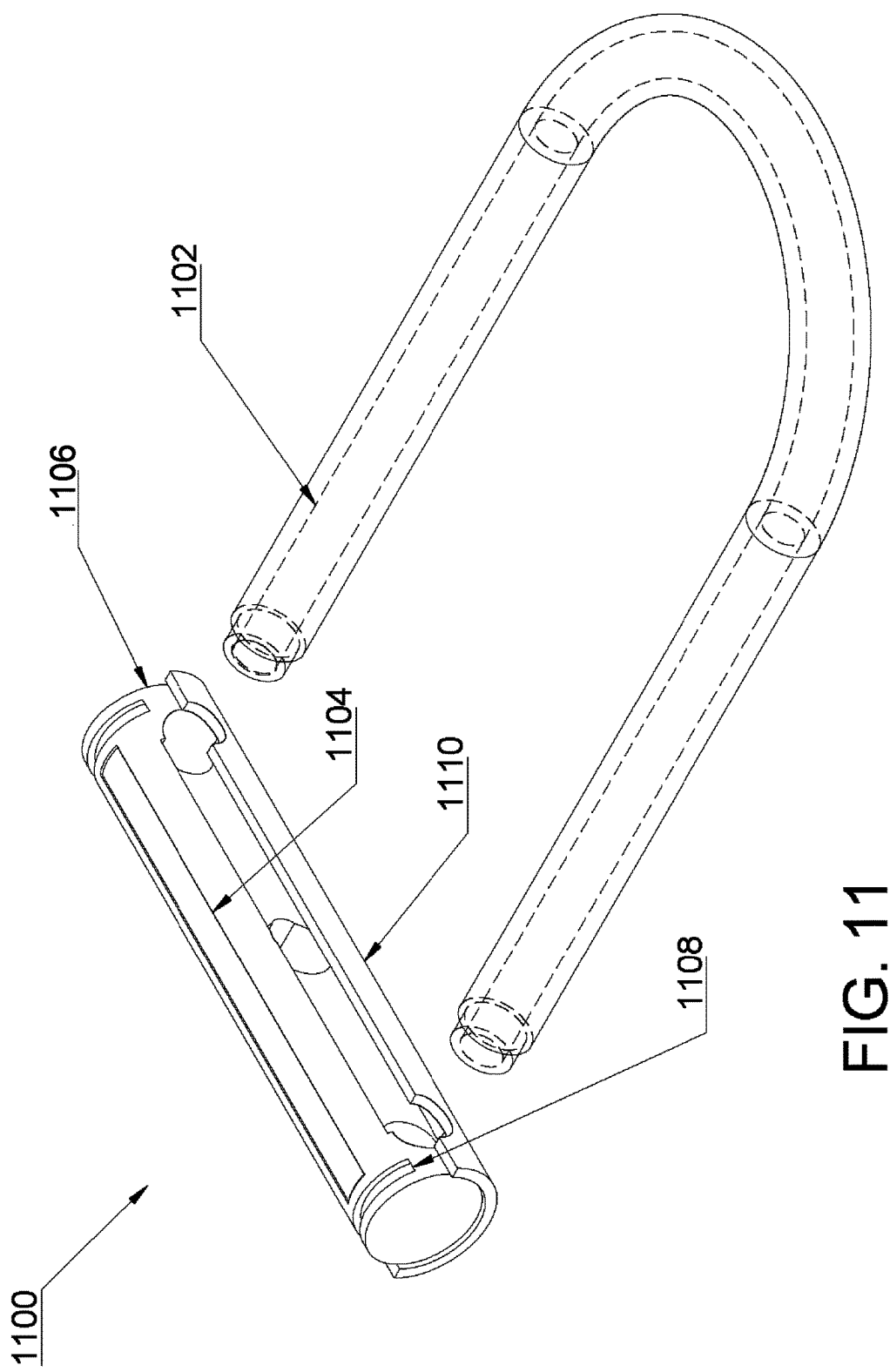
FIG. 11 illustrates a detail view of an exemplary multi-material bicycle lock, in accordance with one or more embodiments of the present disclosure.
Figure 13:
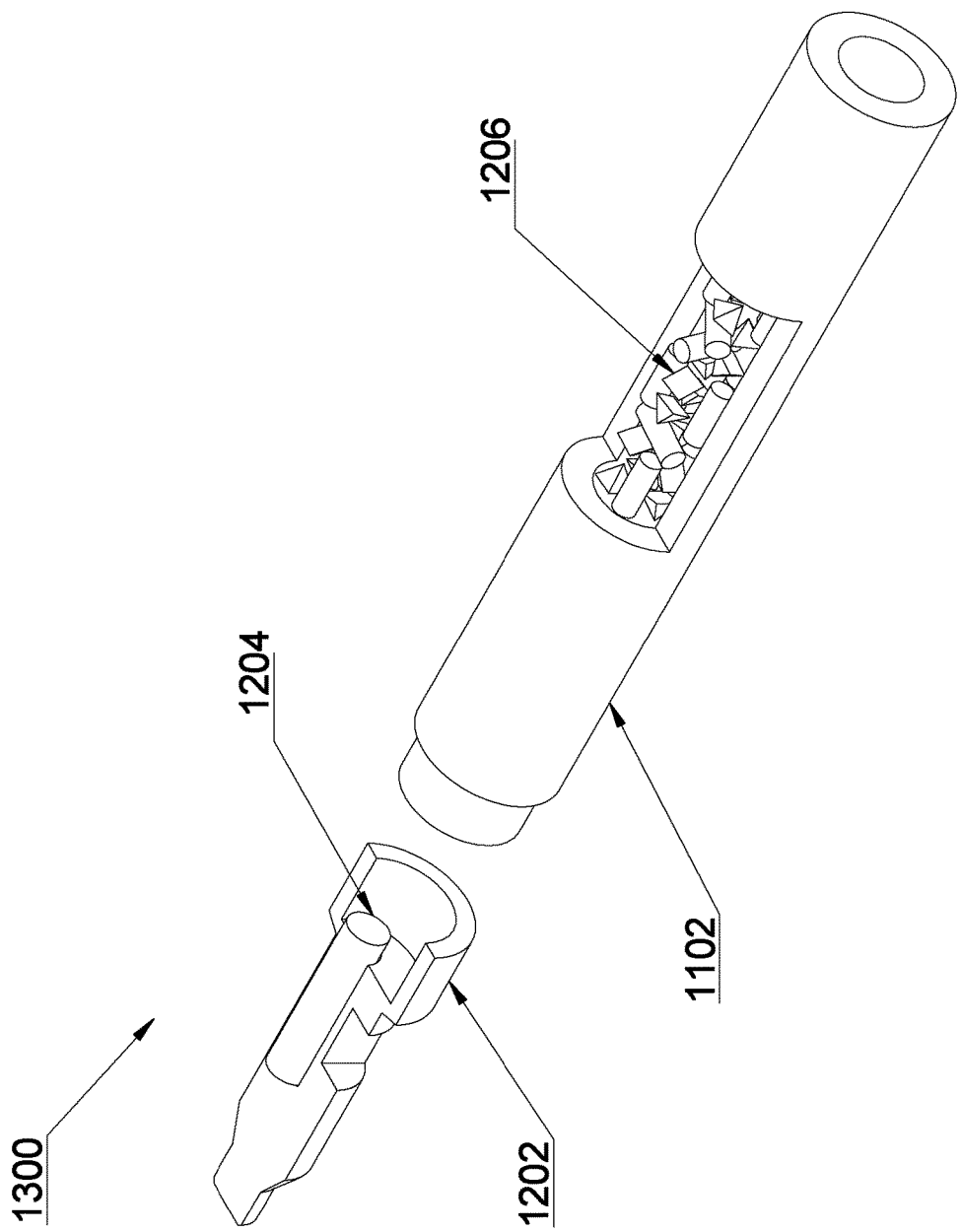
FIG. 13 illustrates a diagram of an exemplary crossbar insert for a multi-material bicycle lock taking the form of a U-lock, in accordance with one or more embodiments of the present disclosure.

Shackle 1002's hollow tube 1102 as depicted in FIG. 11, is made of hardened steel which is sufficiently thick and hardened to resist attacks from cutting tools such as bolt cutters, and shatter proof to something like a hammer. The inside of the tube is filled with ceramic media 306, composed of small ceramic bits packed tightly together as depicted in FIGS. 12 and 13. The ceramic, which can for example be porcelain, aluminum oxide, tungsten carbide, silicon carbide, boron carbide, cubic boron nitride or diamond, is chosen depending on how much resistance is required, and is driven by the cost of the given solution. In some embodiments, a combination of multiple different ceramics or diamond can be used, to increase the resistance while keeping the costs lower. The shape and size of the ceramic media 1206 can have a lot of variations, from cylinders, triangles, pyramids, cubes, spheres, etc. . . . to randomly shaped bits, depending on the type of ceramic and it's production process. Some ceramics can easily be shaped into a choice of geometrical shapes, others can't, and in that case a random monocrystalline structure based on the natural or synthetic crystal growth will result.

Modern cutting tools either use ceramic or diamond bits embedded into a substrate, attach ceramic or diamond cutting pieces to a metal (usually hard steel or tungsten) or perform heat treatments on metal cutting tools to increase their hardness significantly. In order to defeat or significantly slow down (to the point of no longer being practical) these various cutting tools, the theft deterrent device materials need to be selected from the ceramic media 1206 to be harder or close enough in hardness as the cutting tool. Even if the ceramic media is not entirely harder than the cutting tool, the ceramic media 1206 will still significantly slow down the cutting process, as the cutting tool also needs to be sharp to be able to efficiently cut the ceramic media. The sharpness of the ceramic bits in the cutting tool is hard to control, and when attempting to cut another material of similar hardness, that cutting edge will be very quickly dulled. Affordable cutting tools tend to embed small bits of ceramic into a substrate and rely on the ceramic bits to be ripped out of the substrate in order to be replaced by sharper fresh bits under the bit that was removed. When cutting materials of similar hardness, their efficiency goes down significantly, and the tool quickly wears out and has to be replaced. Even when cutting a material with half of their hardness, the cutting process takes a very long time and the cutting tool wears out significantly. It is not practical to cut a material of identical hardness. Thus the ceramic media 1206 will be chosen to correspond in hardness to the cutting tool the lock needs to resist.

When someone attempts to cut the shackle 1002 using a high-end power tool, they will quickly cut through some of the outer hardened steel tube and then reach the ceramic media 1206. At that point, the cutting tool will either be completely ineffective or extremely slow, making the completion of the cut impractical. In one embodiment, the ceramic media is tightly packed into the tube, using various shapes and sizes specifically chosen to cause them to stay in place as the cutting tool attempts to cut through them. Due to the brittle nature of hard ceramics, in another embodiment, the empty space between the ceramic media will be filled by an elastomer (generally using a polymer injection molding machine to provide the pressure necessary to fill up all the space), which could for example be either Polyurethane or Silicone. The elastomer will absorb shocks, preventing the ceramic media from being shattered, and if the ceramic shatters under the cutting tool attack, the elastomer will hold the ceramic in place, and require the cutting tool to continue cutting through it despite its partial loss of structural integrity. The elastomer will also simplify the choice of shapes and sizes, no longer requiring them to be specifically chosen to stay in place, but optimized for cutting resistance. The elastomer may also cause the cutting tool to be rendered less effective as the elastomer melts onto the cutting tool due to the intense heat generated by the friction.

In another embodiment, the empty space between the ceramic media 1206 in the hollow shackle 1102, will be filled with materials or chemicals that will ignite either with contact with oxygen in the atmosphere (now exposed by having cut the hardened steel hollow tube 1102) or the intense heat as well as the sparks generated by the power tool's friction. In one embodiment, this ignition will cause the material to burn intensely hot, causing damage to the cutting tool and generally providing a psychological deterrent to the thief. One common example of that is Magnesium. The materials may be chosen such that they don't need external atmospheric oxygen once ignited, so that they burn effectively while the cutting tool is engaged. For example, Thermite, which could be composed of Aluminum Oxide powder and Iron Oxide powder. In another embodiment, the ignition will cause the materials or chemicals to burn slowly and release an intense smoke, which could also be irritating, make it hard to breathe and/or have a strong smell. This smoke release, combined with the slow cutting speeds involved, will make it particularly hard to continue the cutting process due to the discomfort experienced and the fact that the smoke will attract attention to the theft. An example of such chemical compositions are a combination of Potassium Chloride, common sugar (or other cheap carbohydrate), Sodium Bicarbonate and an organic dye. In another embodiment, those materials or chemicals will be combined with an elastomer. In another embodiment, those materials or chemicals may be contained and combined together within a small soft shell capsule, intermixed with the ceramic media 1206, which will be instantaneously ruptured by the power tool.

Crossbar 1004, as depicted in FIGS. 11 and 12, which has a protective outer cylinder 1110 made of thick hardened steel (to protect from various cutting attacks), also contains ceramic or diamond counter measures. In some embodiments, to protect from side attacks (drilling attacks), it contains two discs 1108, one on each side, and to protect from cutting along it's length, it contains two bars 1104. Crossbar inserts 1202, as depicted in FIGS. 12 and 13, which are made of hardened steel, contain a rod 1204 to protect them from being cut. In one embodiment, discs 1108, bars 1104 and rods 1204 are made of solid shaped ceramic and held in place by an adhesive and cushioning element such as foam backed adhesive tape or a curing elastomer such as Silicone, which will provide shock absorption to avoid the ceramic from shattering and holding it in place if it does. In another embodiment, discs 1108, bars 1104 and rods 1204 will be made of a ceramic or diamond bits embedded in a substrate, providing structural integrity and preventing shattering. In another embodiment, crossbar 1004 will contain further ceramic elements to further prevent potentially weak spots from being attacked.

Figure 14:
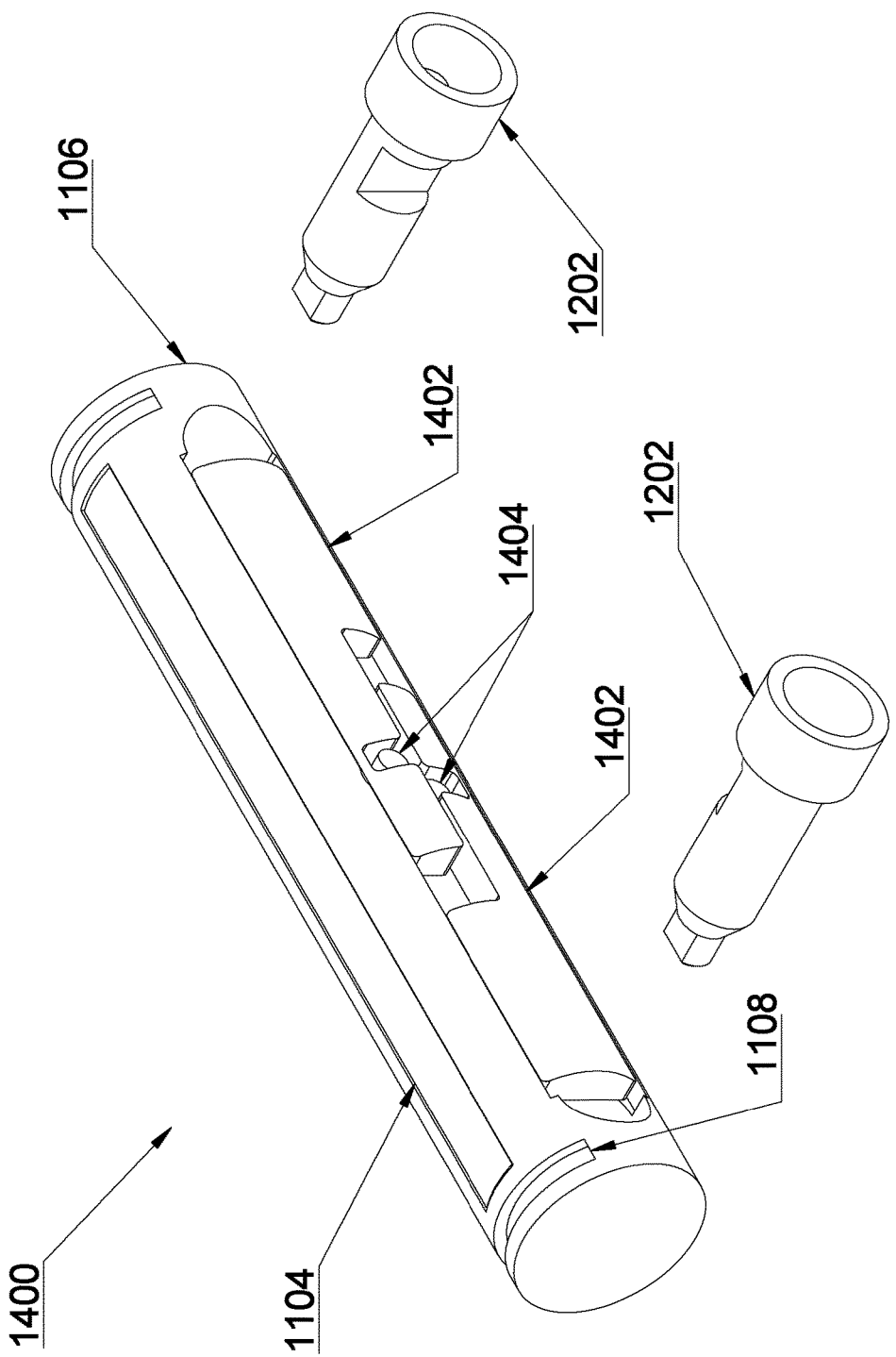
FIG. 14 illustrates a diagram of an exemplary crossbar with inserts for a multi-material bicycle lock taking the form of a U-lock, in accordance with one or more embodiments of the present disclosure.

In some embodiments, crossbar 1004 contains a locking mechanism, composed of either a lock cylinder 1208 or an electric motor, and locking plate with two cam pins 1404, which is tightly coupled to the lock cylinder or the motor, in such a way that when either the lock cylinder is turned using its key or the motor is actuated by its electronic circuit board, the locking plate turns in unison. Cam pins 1404 move the locking bars 1402 back and forth, depending on the rotational direction, and thus change the state from locked to unlocked and vice versa. Locking bars 1402 prevent crossbar inserts 1202 from being removed from the crossbar, when in locked position as depicted in FIG. 14. The locking bars need to have high yield and tensile strengths, to resist pulling attacks on the lock, and thus are made of a steel alloy with those properties.

In one embodiment, the lock design is a padlock, where shackle 1002 is substantially shorter than its representation in FIG. 10, and crossbar 1004's length is reduced as well. Another embodiment involves a rotating shackle instead of a removable one, to minimize the amount of shackle length exposed to an individual attempting to attack the lock. In both cases, ceramic or diamond will be embedded into the shackle and crossbar in an analogous manner to the full size u-lock, in order to provide the same cutting resistance.

Another embodiment involves a disc brake lock, where the crossbar is shaped in such a way that a disc brake can be inserted in between the main body of the crossbar, such that when a short shackle bridges the gap between the two sides of the crossbar, representing the locked state, while going through one of the many holes of the disc brake, it's rotation is heavily restricted and thus the wheel the disc brake is mounted to can no longer rotate, thus immobilizing the vehicle it is attached to.

In some embodiments, a theft deterrent device incorporates some or all the multi-material embodiment features as depicted in FIGS. 10-14 in addition to some or all of the chemical deterrent features as depicted in FIGS. 1-9. In some embodiments, a theft deterrent device incorporates any combination of features described above in order to best suit the needs of the user.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A theft deterrent device comprising:
   a locking portion, the locking portion including a locking mechanism; and
   a housing portion, including a housing portion wall, configured to couple directly with the locking portion, the housing portion comprising a first material and configured to house a second material within the housing portion wall, the second material being made of a different material than the first material, wherein the second material is selected such that a cutting tool will be hindered when trying to cut through the housing portion, wherein the second material comprises randomly shaped pieces that are randomly packed within the housing portion.

2. The device of claim 1, wherein the housing portion wall has a strength and thickness sufficient for providing resistance to or delayed cutting by a cutting tool.

3. The device of claim 2, wherein the second material has a different strength and thickness for providing further resistance or delay to the cutting tool.

4. The device of claim 1, wherein the housing portion wall comprises hardened medium carbon steel.

5. The device of claim 1, wherein the second material comprises ceramic media.

6. The device of claim 1, wherein the second material comprises small bits of material packed tightly together.

7. The device of claim 1, wherein the second material comprises one or more of the following: porcelain, aluminum oxide, tungsten carbide, silicon carbide, boron carbide, cubic boron nitride, and diamond.

8. The device of claim 1, wherein the second material comprises one or more of the following shapes: cylinders, triangles, pyramids, cubes, and spheres.

9. The device of claim 1, wherein empty space within the housing portion is filled with an elastomer.

10. The device of claim 1, wherein empty space within the housing portion is filled with materials or chemicals that ignite upon contact with external oxygen in the atmosphere or ignite while the cutting tool engages with the material.

11. A theft deterrent system comprising:
    a locking portion, the locking portion including a locking mechanism; and
    a housing portion, including a housing portion wall, configured to couple directly with the locking portion, the housing portion comprising a first material and configured to house a second material within the housing portion wall, the second material being made of a different material than the first material, wherein the second material is selected such that a cutting tool will be hindered when trying to cut through the housing portion, wherein the second material comprises randomly shaped pieces that are randomly packed within the housing portion.

12. The theft deterrent system of claim 11, wherein the housing portion wall has a strength and thickness sufficient for providing resistance to or delayed cutting by a cutting tool.

13. The theft deterrent system of claim 12, wherein the second material has a different strength and thickness for providing further resistance or delay to the cutting tool.

14. The theft deterrent system of claim 11, wherein the housing portion wall comprises hardened medium carbon steel.

15. The theft deterrent system of claim 11, wherein the second material comprises ceramic media.

16. The theft deterrent system of claim 11, wherein the second material comprises small bits of material packed tightly together.

17. The theft deterrent system of claim 11, wherein the second material comprises one or more of the following: porcelain, aluminum oxide, tungsten carbide, silicon carbide, boron carbide, cubic boron nitride, and diamond.

18. The theft deterrent system of claim 11, wherein the second material comprises one or more of the following shapes: cylinders, triangles, pyramids, cubes, and spheres.

19. The theft deterrent system of claim 11, wherein empty space within the housing portion is filled with an elastomer.

20. The theft deterrent system of claim 11, wherein empty space within the housing portion is filled with materials or chemicals that ignite upon contact with external oxygen in the atmosphere or ignite while the cutting tool engages with the material.

* * * * *